(12) United States Patent
Jung

(10) Patent No.: US 6,169,822 B1
(45) Date of Patent: Jan. 2, 2001

(54) METHOD FOR CORRECTING DIRECTION OF DOCUMENT IMAGE

(75) Inventor: Sung-woo Jung, Ohsan (KR)

(73) Assignee: Samsung Electronics Co., Ltd., Kyungki-Do (KR)

(*) Notice: Under 35 U.S.C. 154(b), the term of this patent shall be extended for 0 days.

(21) Appl. No.: 09/042,649

(22) Filed: Mar. 17, 1998

(30) Foreign Application Priority Data

Jul. 15, 1997 (KR) .................................................. 97-32913

(51) Int. Cl.⁷ ...................................................... G06K 9/32
(52) U.S. Cl. ........................................... 382/296; 382/297
(58) Field of Search .................................. 382/297, 291, 382/292, 295, 296, 209; 358/488

(56) References Cited

U.S. PATENT DOCUMENTS

| | | | |
|---|---|---|---|
| 5,020,117 | * 5/1991 | Ooi et al. | 382/297 |
| 5,077,811 | * 12/1991 | Onda | 382/297 |
| 5,235,651 | * 8/1993 | Nafarieh | 382/297 |
| 5,471,549 | * 11/1995 | Kurosu et al. | 382/297 |

FOREIGN PATENT DOCUMENTS

| | | | |
|---|---|---|---|
| 2-79184 | 3/1990 | (JP) | G06K 9/20 |
| 6-103411 | 4/1994 | (JP) . | |
| 8-212298 | 8/1996 | (JP) | G06K 9/46 |

* cited by examiner

Primary Examiner—Yon J. Couso
(74) Attorney, Agent, or Firm—Sughrue, Mion, Zinn, Macpeak & Seas, PLLC

(57) ABSTRACT

There is provided a method for automatically correcting a document image whose direction is incorrect, using character recognition. The method includes the steps of detecting a predetermined portion of a character area in the document image, determining the inclination of the document according to the character recognition reliability of the predetermined portion, and recognizing a character by rotating the document at the determined inclination. A large quantity of documents can be automatically processed and even the visually impaired can scan documents by using the automatic direction correcting feature of the document recognizer.

3 Claims, 2 Drawing Sheets

METHOD FOR CORRECTING DIRECTION OF DOCUMENT IMAGE

BACKGROUND OF THE INVENTION

1. Field of the Invention

The present invention relates to a method for correcting the direction of a document image, and more particularly, to a method for automatically correcting a document image direction based on character recognition.

2. Description of the Related Art

In general, character recognition obtains text information by reading a document image through an image input device such as a scanner or a camera, extracting characters from a character area using a computer, and recognizing the extracted characters. However, when characters of the document image are recognized, the document image may be read upside down or rotated 90° clockwise or counterclockwise. In this case, a user conventionally corrects the direction of the document manually and then character recognition is resumed. Further, in automatically processing a large quantity of documents including an image document positioned in a wrong direction, document images not read in a correct direction cannot be recognized.

SUMMARY OF THE INVENTION

To solve the above problems, it is an object of the present invention to provide a method for automatically processing a large quantity of documents and recognizing a document read in an incorrect direction by automatically correcting the image document.

To achieve the above object, there is provided a document image direction correcting method for automatically correcting the angle of a document image, comprising the steps of: (a) detecting a predetermined portion of a character area in the document image; (b) determining the angle of the document according to the character recognition reliability of the predetermined portion of the step (a); and (c) recognizing a character by rotating the document at the angle determined in the step (b).

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
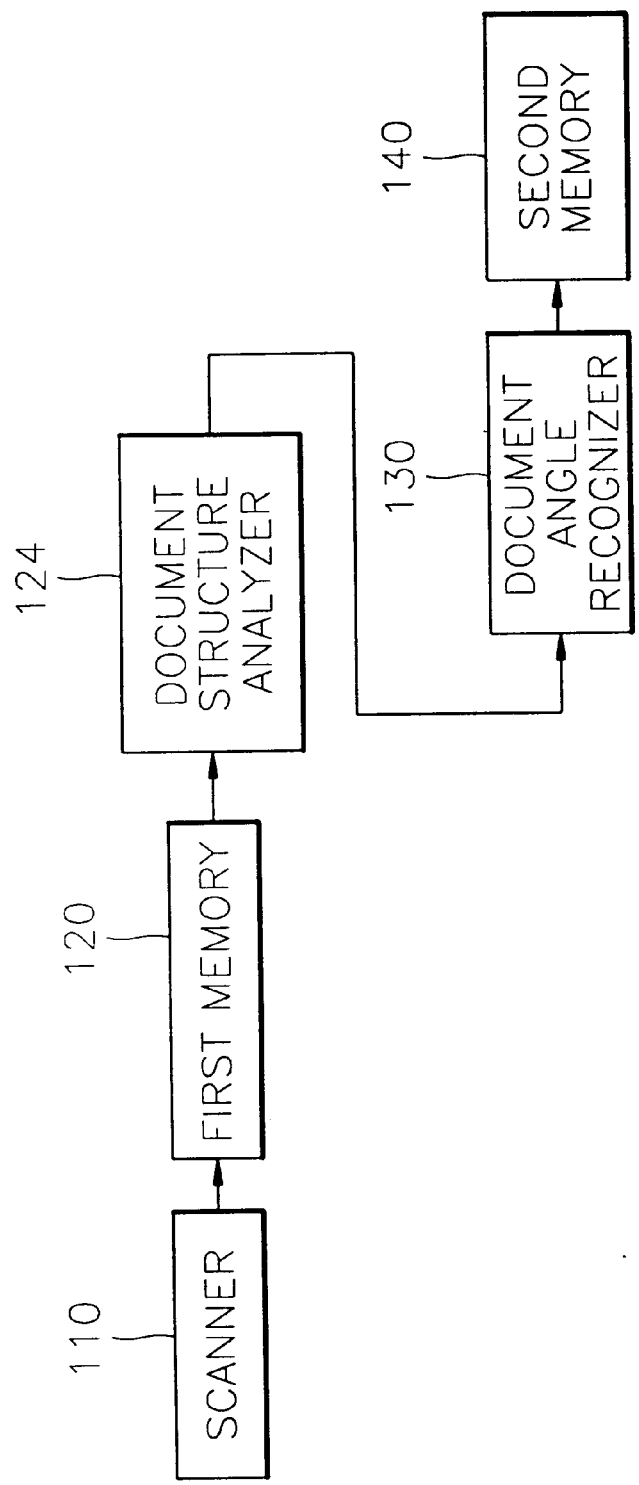
FIG. 1 is a block diagram of a document image direction correcting device according to the present invention.

A document image direction correcting device of the present invention includes a scanner 110 for receiving a document image, a first memory 120 for storing the received document image, a document structure analyzer 124 for analyzing the structure of the document, a document angle recognizer 130 for recognizing the angle at which the document image is disposed with respect to a reference, and a second memory 140 for storing the recognized document image.

Figure 2:
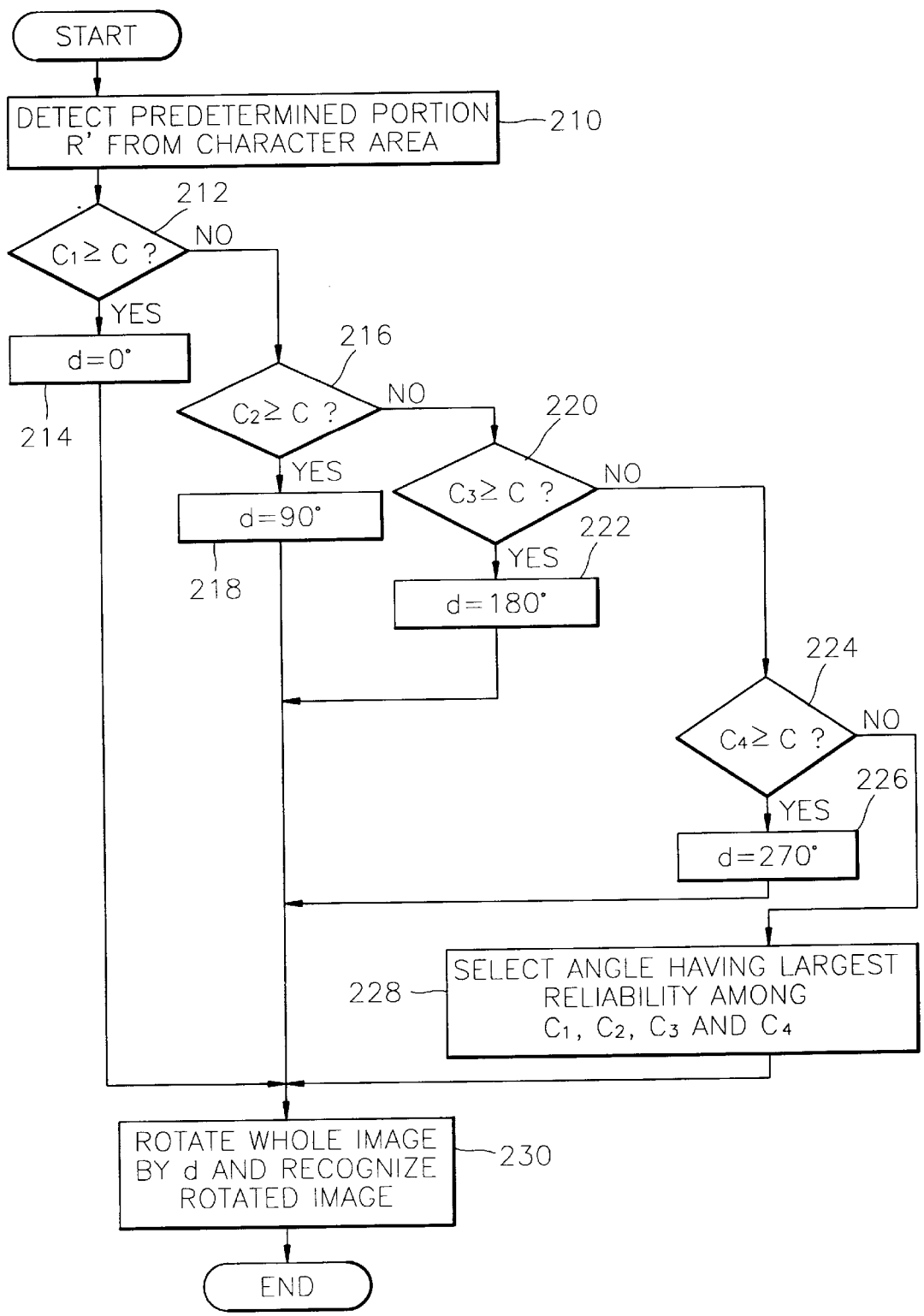
FIG. 2 is a flowchart of a document image direction correcting method according to the present invention.

FIG. 2 is a flowchart of a document image direction correcting method according to the present invention. The operation of the present invention will be described referring to FIGS. 1 and 2.

The scanner 110 reads a whole document image, and the first memory 120 stores the document image received from the scanner 110. The document structure analyzer 124 analyses a text area and a non-text area from the whole image read from the first memory 120. The document angle recognizer 130 recognizes a predetermined text portion R' of a text or character area R, (e.g., at least two rows of characters), and automatically recognizes the direction or the angle at which the document is disposed according to the recognition reliability which is a value representing recognition accuracy. That is, the predetermined portion R' of the character area is detected from the document image in step 210. Here, the recognition reliability is generally expressed as a numerical rank for each character. In step 212, an average recognition reliability C1 of the detected text portion R' is compared with a reference recognition reliability C. If C1 is equal to or greater than C in step 212, the inclination d of the document image is determined to be 0° in step 214, and the whole image is recognized in its current direction in step 230. Here, the average recognition reliability C1 is the sum of the reliability values of all characters included in the text portion R' divided by the number of all characters included in the text portion R'. The document angle recognizer 130 sets a reference recognition reliability by experiment. In step 216, if C1 is smaller than C, the average recognition reliability C2 of the text portion R' rotated at 90° is compared with C. If C2 is equal to or greater than C in step 216, the inclination d of the document image is determined to be 90° in step 218, and the whole image is rotated 90° and then recognized in step 230. Also, if C2 is smaller than C in step 216, the average recognition reliability C3 of the text portion R' rotated at 180° is compared with C in step 220. The inclination of the document image is determined to be 180° in step 222 if C3 is equal to or greater than C in step 220, and the whole image is rotated 180° and then recognized in step 230. If C3 is smaller than C in step 220, the average recognition reliability C4 of the text portion R' rotated at 270° is compared with C, in step 224. If C4 is equal to or greater than C in step 224, the inclination d of the document image is determined to be 270° in step 226 and the whole image is rotated 270° and then recognized in step 230. Then, if C4 is smaller than C in step 224, the best average reliability is selected among C1, C2, C3, and C4 in step 228. Lastly, the whole image is rotated at a corresponding angle in step 228. Lastly, the angle is recognized as that for the document image in step 230. The document image whose direction is corrected in the document angle recognizer 130 is stored in the second memory 140, and recognized as a final document.

As described above, in the present invention, a large quantity of documents can be automatically processed and even the visually impaired can scan documents by using the automatic direction correcting feature of the document recognizer.

While the present invention has been illustrated and described with reference to a specific embodiment, further modifications and alterations will occur to those skilled in the art within the spirit and scope of this invention.

What is claimed is:

1. A document image direction correcting method for automatically correcting the angle of a document image, comprising:

(a) detecting a predetermined portion of a character area in the document image;

(b) determining an angle at which the document is positioned by comparing a character recognition reliability value of the predetermined portion representing recognition accuracy with a reference recognition reliability value; and (c) recognizing a character by rotating the document at the angle determined in the step (b), wherein the step (b) comprises the substeps of:
  (b1) comparing an initial average character recognition reliability value of the predetermined portion with the reference recognition reliability value, and determining the angle of the document as correct if said average character recognition reliability value is larger than said reference recognition reliability value; and
  (b2) rotating a predetermined portion of the text area at a predetermined angle if the initial average character recognition reliability value is smaller than the reference recognition reliability value in said step (b1), determining whether a second average character recognition reliability value of the predetermined portion is larger than the reference recognition reliability value, and determining the angle of the document as the predetermined angle if the second average character recognition reliability value is larger than the reference recognition reliability value.

2. The document image direction correcting method as claimed in claim 1, wherein the average recognition reliability value is a sum of the reliability values of all characters included in the predetermined portion divided by a total number of characters included in the predetermined portion.

3. The document image direction correcting method as claimed in claim 1, further comprising the substep of:
  (b3) determining the angle of the document as corresponding to a largest average recognition reliability value if all of the average character recognition reliability values of the predetermined portion are smaller than the reference recognition reliability value.

* * * * *